(No Model.)

B. V. GINTZ.
PNEUMATIC TIRE.

No. 564,190. Patented July 21, 1896.

Witnesses
J. H. Stratton

Inventor
Benjamin V. Gintz;
By his Attorney

UNITED STATES PATENT OFFICE.

BENJAMIN V. GINTZ, OF AKRON, OHIO.

PNEUMATIC TIRE.

SPECIFICATION forming part of Letters Patent No. 564,190, dated July 21, 1896.

Application filed September 20, 1895. Serial No. 563,055. (No model.)

*To all whom it may concern:*

Be it known that I, BENJAMIN V. GINTZ, a citizen of the United States, residing at Akron, in the county of Summit and State of Ohio, have invented a certain new and useful Improvement in Pneumatic Tires, of which the following is a specification.

My invention has relation to improvements in pneumatic tires for bicycles and other vehicles; and it has for its object the production of a tire of great elasticity in which the bearing portion or "tread" shall be internally reinforced, so as to give great strength and durability to that part and permit of the ready and complete repair of any punctures therein.

It consists essentially of two tubes of vulcanized rubber gum, with an internal layer of woven fabric, the whole being reinforced internally toward the bearing-surface by alternate layers of fibrous felt and prepared fabric, and ending in a layer of vulcanized gum caoutchouc, forming a diaphragm united at either side with the inner rubber tube.

My invention is illustrated in the accompanying drawings, in which similar reference-letters indicate like parts in the different figures.

Figure 1:
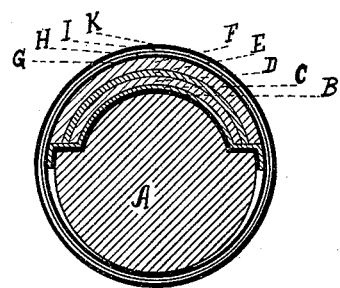
Figure 2:
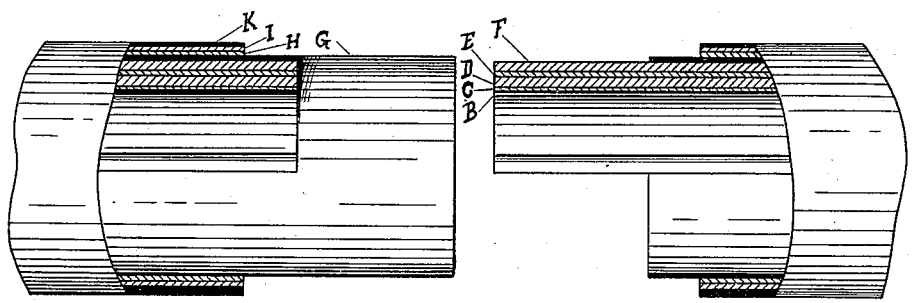

Figure 1 is a cross-section of my improved tire; and Fig. 2, a side elevation of the two ends of the same, the immediate ends being in central longitudinal section.

In constructing this tire I use soft sheet rubber prepared for vulcanizing; woven fabric, as light cotton duck, treated with unvulcanized rubber gum, and elastic fibrous felt.

The tire is built up on a metallic mandrel A, the outer half concentric with but of less diameter than the inner, and united by square shoulders above and parallel with the diameter. Upon this reduced portion is laid a strip of prepared rubber B, extending over the shoulders and slightly down the larger part of the mandrel. Upon this and coextensive therewith is a sheet C of prepared duck; and over this a layer of felt D, reaching to the duck C at the shoulders. Upon this are successively laid a second layer of prepared duck E and a second layer of felt F. As each successive layer is placed in position its surface is coated with a cement of a solution of caoutchouc, ground sponge, and flour emery, which has the merit of being siccative, and is used in form of a thin paste. This part of the tire is elastic and heavy to constitute the reinforced tread. About the tread thus formed and the inner part of the mandrel is then placed the inner tube G of prepared rubber, about which in turn is placed a second sheet of prepared duck H, and if desired, a second layer I of the same, and a final tube K of rubber, forming the outside or finish of the tire. These parts are successively cemented as they are placed in position, as were the layers of the tread. As each successive layer is placed in position, as hereinbefore stated, it is rolled with a suitable tool to render it smooth and firm and cause it to unite more closely with the cement and the preceding layer. The tire is now ready for splicing, which is done by cutting the several layers of different lengths, so that when united they will break joints; preferably as shown, the layer G of one end sliding over the longer ends of the layers B C D E F, leaving the layers H I K, which are cut back of this, separated. The tube is then removed from the mandrel and a sheet of rubber like G and K wrapped about the ends between the outer cases, completing the cover. The whole is then vulcanized by the usual or any approved manner, and in the completed tire a gate is placed for the air-pump tube.

The exact number of reinforcing-plies will of course depend upon the amount of wear and pressure the tire is to be subjected to and the nature of the roads it is to travel on.

Having thus described my invention, what I claim, and desire to secure by Letters Patent, is—

1. The herein-described pneumatic tire, consisting of a continuous tube, alternate strips of duck and felt having their faces coated with a solution of caoutchouc, ground sponge and flour emery, said strips being cemented to the interior tread portion of said tube, and a rubber strip of greater width than the aforesaid strips cemented to the edges and outermost layer of said strips and to the inner tube, substantially as described.

2. The cement composition herein described consisting of caoutchouc, ground sponge, and flour emery mixed to the consistency of a thin paste and adapted when applied to the faces of layers comprising a pneumatic tire to hold said layers together, substantially as described.

In testimony that I claim the above I hereunto set my hand.

BENJAMIN V. GINTZ.

In presence of—
C. E. HUMPHREY,
C. P. HUMPHREY.